M. P. SQUIRES.
GRINDING-MILLS FOR SOFT CORN.
No. 193,784. Patented July 31, 1877.
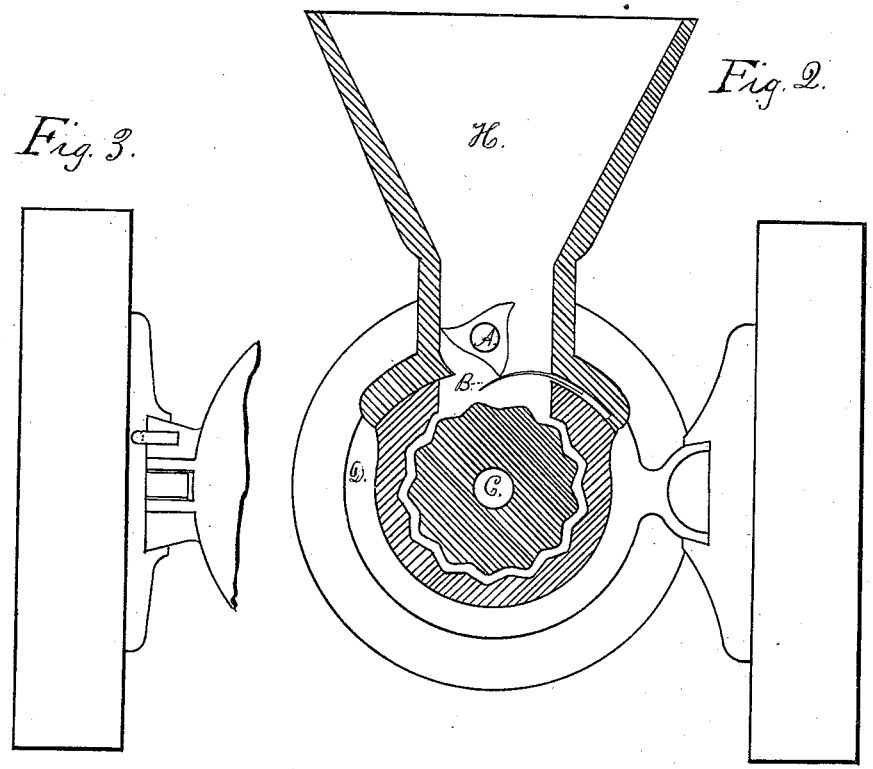
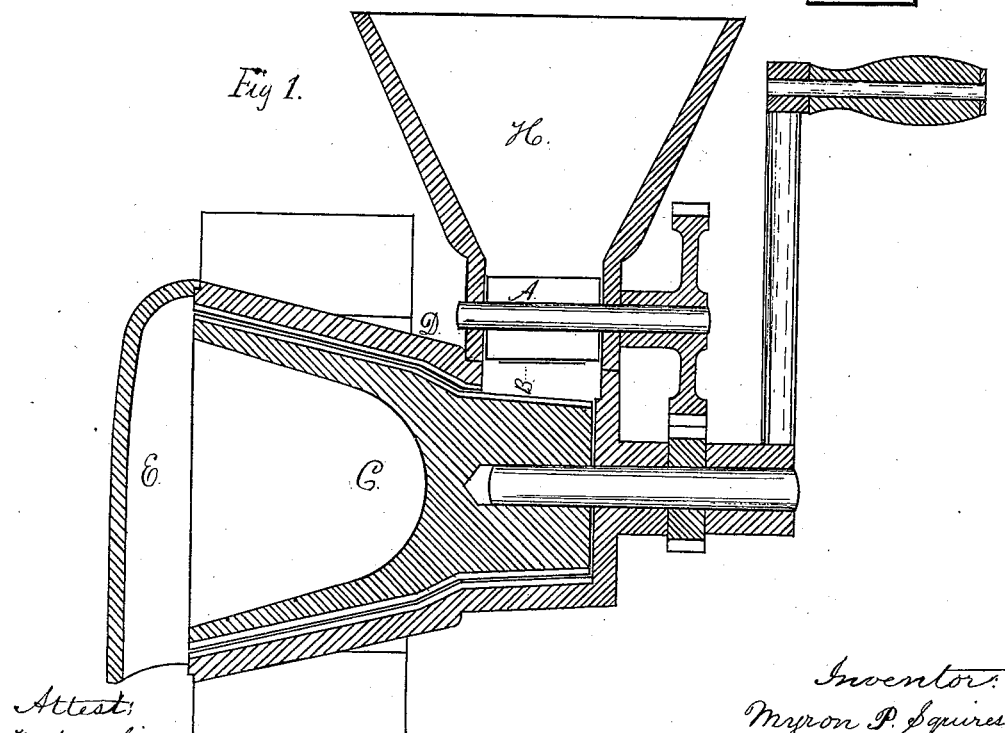

UNITED STATES PATENT OFFICE.

MYRON P. SQUIRES, OF STONINGTON, CONNECTICUT.

IMPROVEMENT IN GRINDING-MILLS FOR SOFT CORN.

Specification forming part of Letters Patent No. 193,784, dated July 31, 1877; application filed May 7, 1877.

*To all whom it may concern:*

Be it known that I, MYRON P. SQUIRES, of Stonington, in the county of New London and State of Connecticut, have invented a new and useful Improvement in Machines for Grinding Soft Corn, and other soft and adhesive substances, which improvement is fully set forth in the following specification and accompanying drawings, in which—

Figure 1 is a longitudinal section of the machine. Fig. 2 is a vertical cross-section of the front end of the same. Fig. 3 shows the method of attaching the mill to a post.

The object of my invention is to furnish a machine that will overcome the difficulty of feeding in and grinding soft corn and other soft and adhesive substances of similar character, and perform the work in an efficient and inexpensive manner.

In the drawings, A is the feeder. This is a three-sided piece of metal mounted upon a shaft, and is of such length and width of faces as will fill the space afforded in the throat of the hopper, and may be so constructed as that a vertical section thereof shall exhibit plane, concave, or convex lines, or a combination of the same.

A rotary motion is communicated to the feeder by a wheel-geared to the cylinder-shaft, but may be communicated in any other manner.

The duty and office of the feeder are to feed the soft corn, or other similar material, from the hopper to the grinding-cylinder and press it upon the same.

It is obvious that a feeder with more or less faces than here shown can be used to accomplish a like result.

B is a scraper formed of brass or some similar material, whose length is equal to the length of the face of the feeder A. The scraper is so attached to the side of the throat of the hopper as that it will impinge upon the edge of the faces of the feeder as they revolve, thus clearing the feeder of any of the soft corn or other similar material that may adhere to it, and at the same time co-operating with the feeder in pressing the soft corn or other material upon the grinding-cylinder. C is the grinding-cylinder, having its corrugations or teeth straight or horizontal on the feeding part, but curved on the grinding part thereof. D is the shell inclosing the grinding-cylinder. This has also curved corrugations or teeth for grinding. E is a hinged cap covering the end of the cylinder closely when closed, and giving free access to the cylinder when open. H is the hopper.

Having thus described my invention, what I claim as new, and desire to secure by Letters Patent, is—

The combination of rotary feeder A and scraper B with grinding-cylinder C and shell D and hinged cap E, all substantially as shown and described.

MYRON P. SQUIRES.

Witnesses:
OSCAR F. PENDLETON,
DANIEL E. BARKER,